US006443586B1

(12) United States Patent
Azima et al.

(10) Patent No.: US 6,443,586 B1
(45) Date of Patent: Sep. 3, 2002

(54) LIGHT-EMITTING PANEL-FORM LOUDSPEAKER

(75) Inventors: Henry Azima, Cambridge; Edward Jarvis, Cambridgeshire; Neil Simon Owen, Cambridgeshire; Kieron Dunk, Cambridgeshire, all of (GB)

(73) Assignee: New Transducers Limited, London (GB)

( * ) Notice: Subject to any disclaimer, the term of this patent is extended or adjusted under 35 U.S.C. 154(b) by 0 days.

(21) Appl. No.: 09/523,099

(22) Filed: Mar. 10, 2000

Related U.S. Application Data

(60) Provisional application No. 60/150,592, filed on Aug. 26, 1999, and provisional application No. 60/158,384, filed on Oct. 12, 1999.

(30) Foreign Application Priority Data

Mar. 10, 1999 (GB) ............................................ 9905374
Sep. 24, 1999 (GB) ............................................ 9922511

(51) Int. Cl.[7] ................................................ G11B 33/06
(52) U.S. Cl. ........................................... 362/86; 362/87
(58) Field of Search ............................. 362/26, 31, 86, 362/147, 87, 811, 364; 381/87, 88; 181/141, 150, 153

(56) References Cited

U.S. PATENT DOCUMENTS

| | | | | | |
|---|---|---|---|---|---|
| 2,083,753 | A | * | 6/1937 | Turner | 362/86 |
| 4,559,584 | A | | 12/1985 | Kuwahata et al. | 362/86 |
| 4,820,952 | A | | 4/1989 | Lee | 310/334 |
| 4,875,143 | A | * | 10/1989 | Fermandez | 362/86 |
| 4,887,197 | A | * | 12/1989 | Effinger | 362/86 |

FOREIGN PATENT DOCUMENTS

| | | |
|---|---|---|
| FR | 2 649 575 | 1/1991 |
| WO | WO 97/09840 | 3/1997 |
| WO | WO 97/09843 | 3/1997 |
| WO | WO 99/65274 | 12/1999 |

* cited by examiner

*Primary Examiner*—Y. My Quach-Lee
(74) *Attorney, Agent, or Firm*—Foley & Lardner

(57) ABSTRACT

A combination panel-form loudspeaker/light comprising a panel having a front face and rear face, a vibration exciter mounted to the member to excite bending-wave vibration in the member, and a light emitter mounted at or adjacent to the panel and arranged to illuminate an area adjacent to the panel.

11 Claims, 4 Drawing Sheets

FIG. 2c
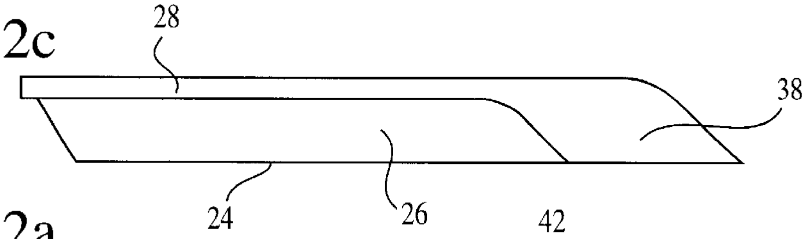
FIG. 2a
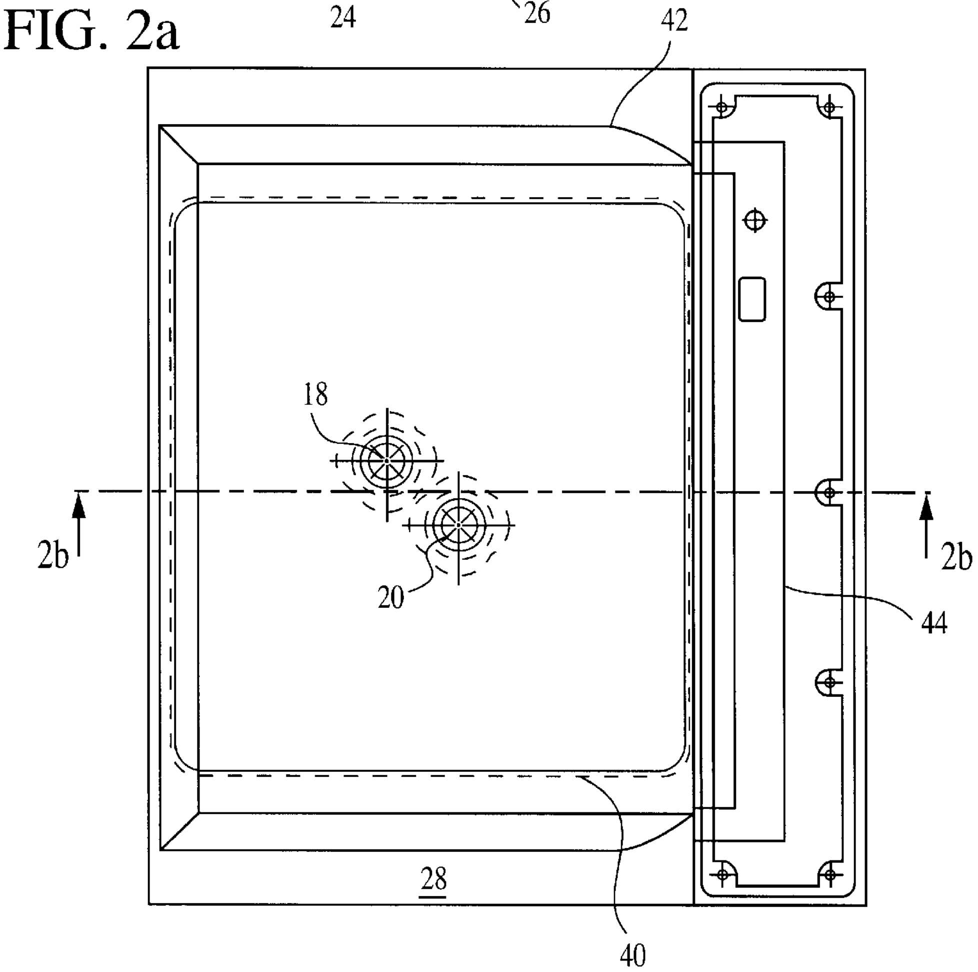
FIG. 2b
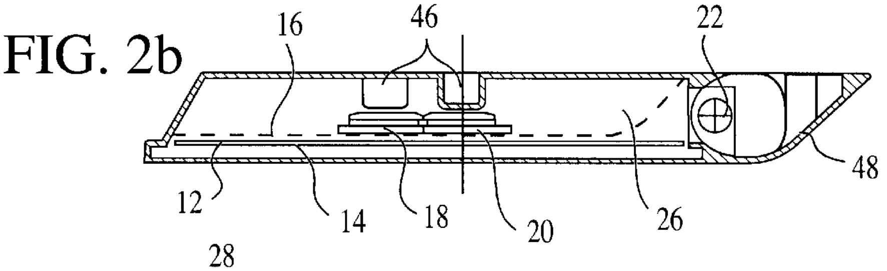
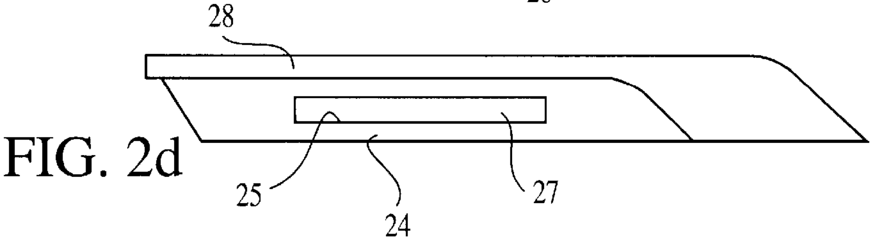
FIG. 2d

LIGHT-EMITTING PANEL-FORM LOUDSPEAKER

This application claims the benefit of U.S. provisional application No. 60/150,592, filed Aug. 26, 1999, and U.S. provisional application No. 60/158,384, filed Oct. 12, 1999.

TECHNICAL FIELD

The invention relates to loudspeakers and more particularly to bending wave panel-form loudspeakers, e.g. of the general kind described in International patent application WO97/09842.

BACKGROUND ART

The technology described in International patent application WO97/09842 and its U.S. counterpart application No. 08/707,012, filed Sep. 3, 1996 (the latter being incorporated herein by reference in its entirety) has come to be known as distributed mode or DM technology and among other things, these applications describe a ceiling tile/loudspeaker combination. A feature of bending wave panel-form loudspeakers is that they may be made flat and of shallow depth and may thus be wall or ceiling mounted in a domestic, or other, environment to occupy a minimum of space. It has also been suggested that the flat front face of the loudspeaker may be disguised as a picture or mural.

SUMMARY OF THE INVENTION

It is an object of the invention to extend the utility of such wall or other surface mounting of panel-form loudspeakers for other purposes, by combining such loudspeakers with other devices in synergistic combinations.

According to the invention, there is provided a panel-form loudspeaker comprising a bending wave panel having a front face and rear face, a vibration exciter mounted to the panel to excite bending-wave vibration in the panel, and a light emitter mounted at or adjacent to the rear face of the panel and arranged to illuminate an area adjacent to the panel. A light reflector may be provided to direct light from the light emitter. The panel may be transparent or translucent.

The loudspeaker may comprise an enclosure defining a cavity enclosing at least a portion of the rear face of the panel. The light-emitter may be disposed in the cavity and may be arranged to emit light through at least one window therein. The enclosure may be transparent or translucent to light. The enclosure may be moulded from a clear plastic such as polycarbonate. The enclosure may be formed with one or more lenses to direct the emitted light as desired. The lens(es) may be moulded integrally with the enclosure.

The enclosure is preferably acoustically opaque to prevent or reduce acoustic radiation from the rear face of the panel. The cavity may be dimensioned such as to modify the modal behaviour of the member, e.g. as taught in W099/52322 and U.S. Pat. No. 08/707,012.

The light emitter may comprise a fluorescent device, or other device which does not emit significant heat. Such a device may be a low voltage device. Power to the light emitter may be supplied via electrically conductive lead(s) supplying power to the vibration exciter.

The loudspeaker may further comprise a front cover. The front cover will be acoustically transparent to allow acoustic radiation from the panel to pass through. The front cover is preferably opaque to light. The front cover may be arranged to extend beyond the panel perimeter and the enclosure. The loudspeaker may be adapted to be wall mounted or to be ceiling mounted, e.g. as a ceiling tile. Thus, when so mounted, the front cover may at least partly conceal the loudspeaker enclosure from view.

BRIEF DESCRIPTION OF THE DRAWING

Examples which embody the best mode for carrying out the invention are described in detail below and are diagrammatically illustrated in the accompanying drawing in which:

FIG. 2*a* is a rear plan view of a panel-form loudspeaker embodying the present invention and generally as shown in FIG. 1;

FIG. 2*b* is a cross-section along line 2*b*—2*b* of FIG. 2*a;*

FIG. 2*c* is a side view of the loudspeaker of FIG. 2*a;*

FIG. 2*d* is a side view similar to FIG. 2*c* showing a modification;

DETAILED DESCRIPTION

Figure 1:
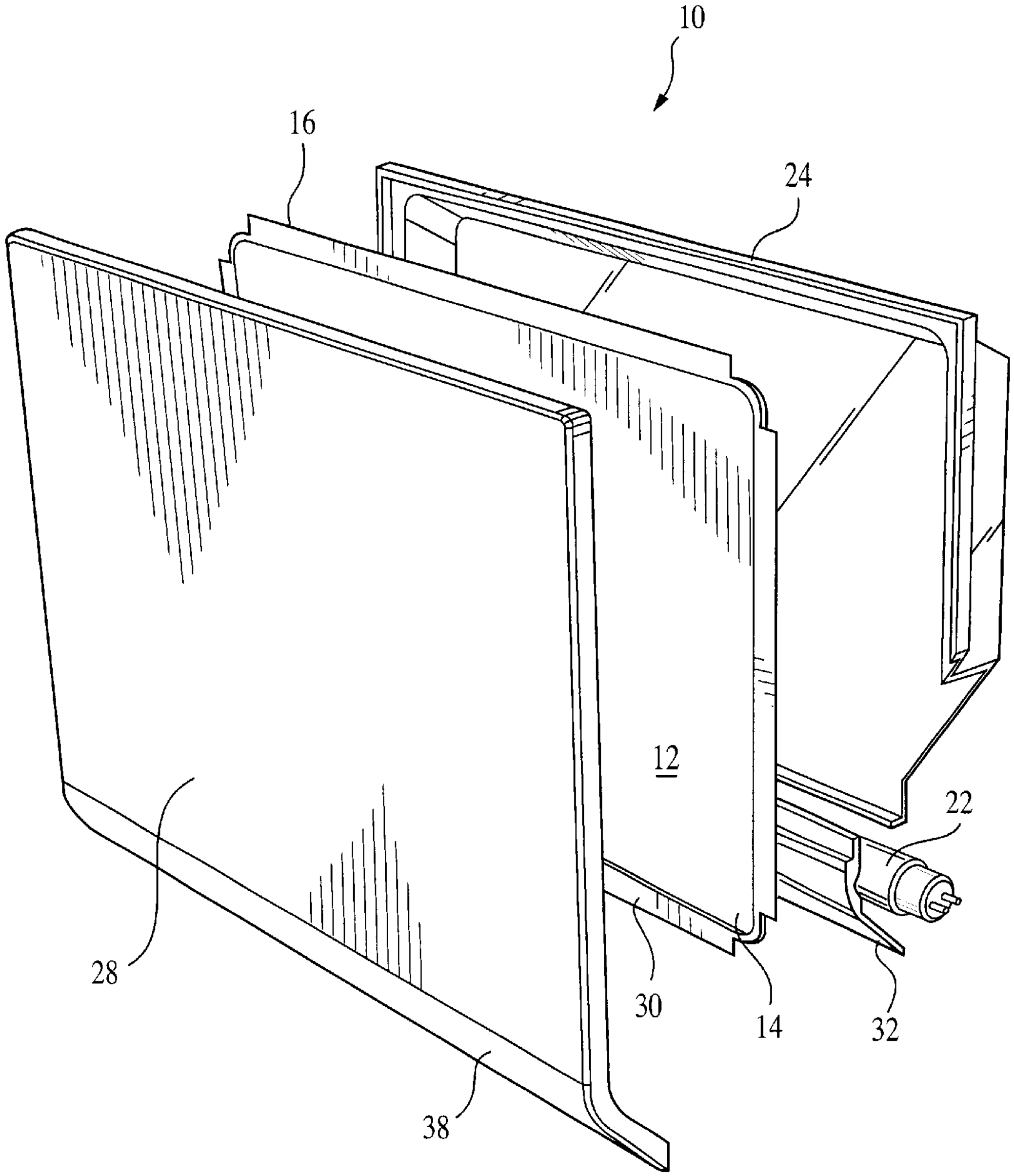
FIG. 1 is an exploded perspective view of a panel-form loudspeaker embodying the present invention and intended for wall mounting.

FIGS. 1 and 2 of the drawing show a panel-form loudspeaker/light fitting combination (10) comprising a resonant panel (12) having a front face (14) and rear face (16) and two vibration exciters (18, 20) mounted on the panel (12) to excite bending-wave vibration in the panel (12) to cause it to resonate and produce an acoustic output generally as described in WO 97/09842 and U.S. Pat. No. 08/707,012.

The loudspeaker (10) further comprises a shallow rear box-like enclosure (24) which defines a cavity (26) enclosing the rear face (16) of the panel (12). The enclosure (24) is acoustically opaque to prevent or reduce acoustic radiation from the rear face (16) of the panel (12). The panel (12) is mounted to the rear enclosure by means of a resilient suspension (30) extending around the perimeter of the panel (12).

A light-emitter (22) in the form of a fluorescent tube is mounted in a support (32) in the enclosure (24) and at the lower edge thereof, as seen in FIG. 1. The enclosure (24) is transparent to light and moulded from a plastics material. The support (32) for the light-emitter (22) comprises a reflector (48) which directs the emitted light as desired. In this embodiment, the loudspeaker (10) is intended for wall-mounting and thus the light is directed outwardly through the top and sides of the transparent rear enclosure (24) so that the loudspeaker also forms a wall light.

FIG. 2*d* shows a modification of the loudspeaker that affects the pattern of light emitted through the enclosure (24). A window (25) may be provided in one or more of the side walls of the enclosure (24) through which light is emitted. The window (25) may be a simple opening, or be fitted with a lens (27) to direct emitted light. The lens (27) may be moulded integrally with the enclosure (24).

A decorative front cover (28) is mounted to the enclosure (24) to cover the front face (14) of the panel (12) and the support (32). The front cover (28) is acoustically transparent and opaque to light. Accordingly, acoustic radiation from the panel (12), but not light from the fluorescent tube, is allowed to pass through the cover (28). A lower portion (38) of the front cover is curved to match the profile of the support (32).

The front cover (28) extends beyond the edges (42) of the rear enclosure (24) so that when the loudspeaker is wall mounted, the front cover (28) conceals the enclosure from view.

FIG. 2*a* is a rear view of the loudspeaker with the outline of internal components, e.g. the perimeter (40) of the panel (12) and the edges (44) of the fluorescent tube shown with dotted line. The exciters (18, 20) are mounted off-centre of the panel (12) as taught in WO97/09842 and U.S. Pat. No. 08/707,012. Thus the panel has the capability to sustain and propagate input vibrational energy by a plurality of resonant bending wave modes in at least one operative area extending transversely of thickness, wherein the frequencies of resonant bending wave modes are interleaved in a predetermined frequency range so that the resonant bending wave modes are substantially evenly distributed in frequency and wherein the vibration exciters are mounted on said operative area of the panel at preferential locations or sites for coupling to the resonant bending wave modes, to vibrate the panel and excite said resonant bending wave modes in the panel, the resonant bending wave modes in turn producing an acoustic output.

FIG. 2*b* shows that the exciters (18, 20) are mounted on the rear face (16) of the panel (12) and that additional support for the exciters (18, 20) may be provided by resiliently suspending them on the rear enclosure (24), e.g. as taught in WO98/31188 and its U.S. counterpart application No. 09/341,295, filed Jan. 5, 1998 (the latter being incorporated herein by reference in its entirety). Accordingly, the rear enclosure comprises two inward projections or bosses (46) which are aligned with the exciters (18, 20), so that the resilient suspension,. not shown, can be disposed between the projections (46) and the exciters.

Figure 3:
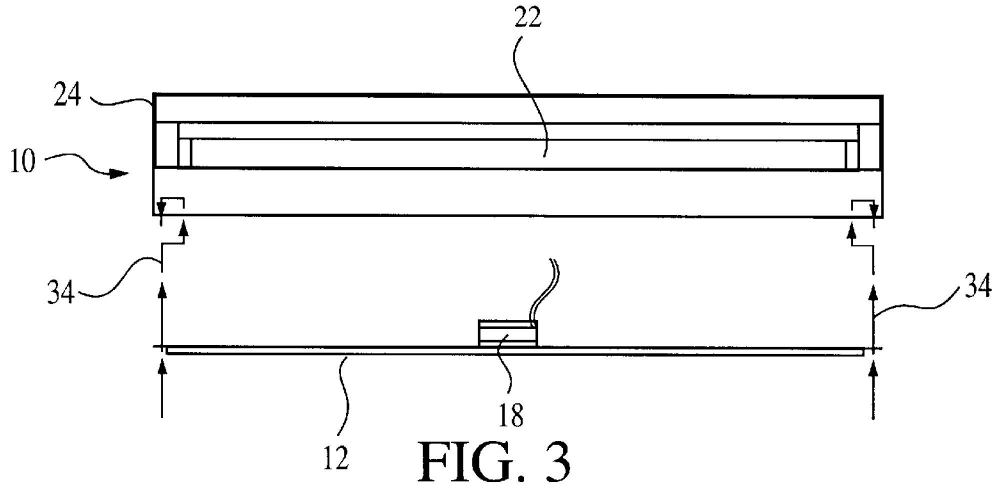
FIG. 3 is a cross-sectional side view of an embodiment of light fitting or tile for a suspended ceiling.

FIG. 3 shows an embodiment of light fitting or tile/loudspeaker combination (10) for a suspended ceiling (not shown) comprising a translucent resonant panel (12) having a vibration exciter (18) thereon, e.g. as taught in WO97/09842 and U.S. Pat. No. 08/707,012 mounted in a box-like enclosure (24) to form a cavity (26) in which a fluorescent light fitting (22) is positioned. The mounting of the panel (12) in the enclosure (24) is indicated by arrows (34) and is described further with reference to FIG. 7 below.

Figure 4:
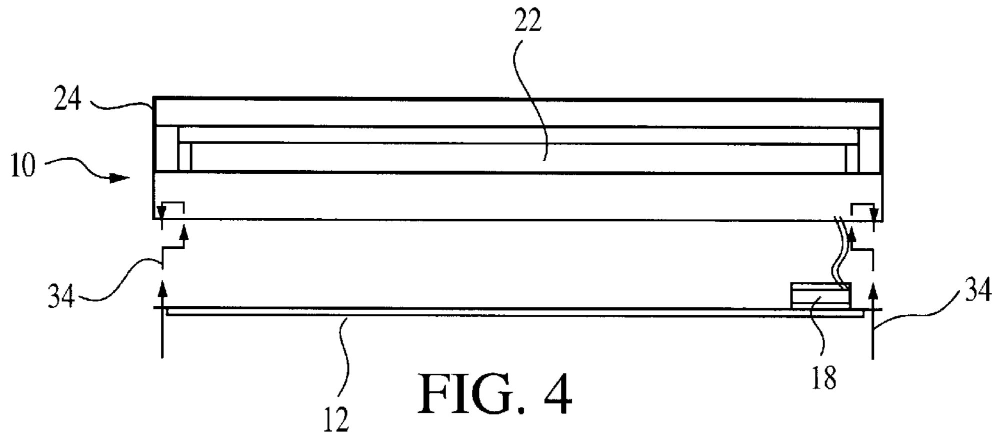
FIG. 4 is a cross-sectional side view of another embodiment of light fitting or tile for a suspended ceiling.

FIG. 4 shows an embodiment of light fitting/loudspeaker combination (10) generally similar to that of FIG. 3 and showing a vibration exciter (18) mounted on a translucent panel (12) at a position adjacent to the edge of the panel, as taught in WO99/37121 and its U.S. counterpart application No. 09/233,037, filed Jan. 20, 1999 (the latter being incorporated herein by reference in its entirety), whereby the exciter can be hidden from view if desired.

Figure 5:
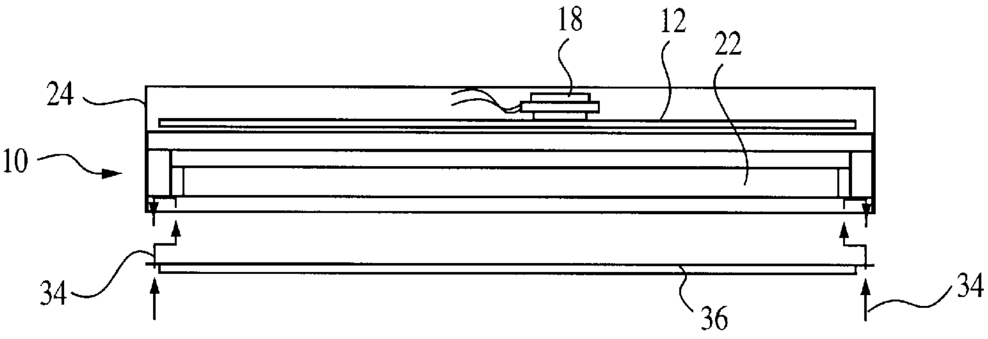
FIG. 5 is a cross-sectional side view of yet another arrangement of suspended ceiling light fitting or tile.
Figure 6:
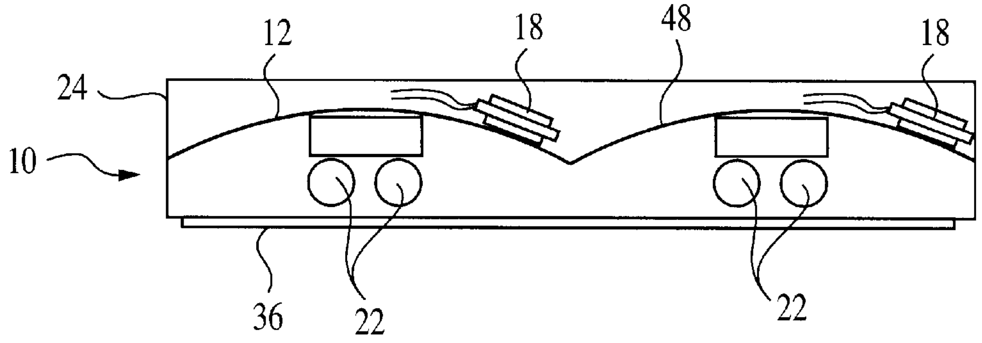
FIG. 6 is a cross-sectional side view of a further embodiment of suspended ceiling light fitting or tile.

FIG. 5 shows an arrangement of suspended ceiling/loudspeaker combination (10) with a light fitting generally similar to that of FIGS. 3 and 4 and showing the resonant panel (12) mounted above the fluorescent light (22) in the enclosure and with a ceiling tile (36) in the form of an open grille below the light fitting (22) FIG. 6 is a cross-sectional side view of an embodiment of suspended ceiling light fitting/loudspeaker combination (10) similar to those described above in FIGS. 3 to 5 and comprising a box-like enclosure (24) housing a curved light reflector (48) in the form of a resonant panel (12) excited by vibration exciter (18) and with fluorescent light fitting (22) mounted below the reflector (48) and a ceiling tile (36) in the form of an open grille below the light fittings to close the enclosure (24).

Figure 7:
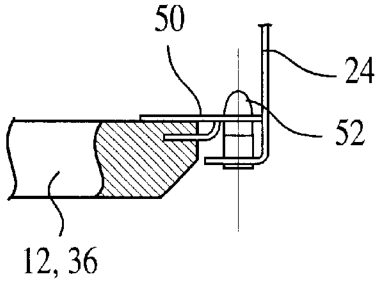
FIG. 7 is a scrap cross-sectional side view relevant to the embodiments of FIGS. 3 to 6.

FIG. 7 is a scrap cross-sectional side view showing how the resonant panel (12) and/or tile (36) in the embodiments of FIGS. 3 to 6 can be supported in the enclosure (24) at its edges by means of brackets (50) mounted on the edges of the panel (12) or tile (36), the brackets being formed with apertures (not shown) which are located and mounted on upstanding pegs (52) in the enclosure (24).

The invention thus provides a slim panel-form loudspeaker of increased utility, and which can be used to provide wall or ceiling lighting.

What is claimed is:

1. A combination panel-form loudspeaker/light comprising a panel having a front face and rear face, a vibration exciter mounted to the panel to excite bending-wave vibration in the panel, a light emitter mounted at or adjacent to the panel and arranged to illuminate an area adjacent to the panel, and an enclosure defining a cavity enclosing at least a portion of the rear face of the panel, wherein the enclosure is transparent or translucent to light.

2. A combination according to claim 1, comprising a light reflector positioned adjacent to the light emitter to direct light from the light emitter.

3. A combination according to claim 1, comprising at least one window in the enclosure, and wherein the light-emitter is disposed in the cavity and is arranged to emit light through the at least one window.

4. A combination according to claim 1 wherein the enclosure is moulded from a clear plastics.

5. A combination according to claim 1, wherein the enclosure is formed with at least one lens to direct emitted light.

6. A combination according to claim 5, wherein the lens is moulded integrally with the enclosure.

7. A combination according to claim 6, wherein the enclosure is acoustically opaque to prevent or reduce acoustic radiation from the rear face of the panel.

8. A combination according to claim 7, wherein the panel is translucent.

9. A combination according to claim 1, wherein the enclosure is adapted to be wall mounted or to be ceiling mounted.

10. A combination according to claim 1, comprising a ceiling tile mounted to the enclosure.

11. A combination panel-form loudspeaker/light comprising a translucent panel having a front face and rear face, a vibration exciter mounted to the panel to excite bending-wave vibration in the panel, a light emitter mounted at or adjacent to the panel and arranged to illuminate an area adjacent to the panel, and an enclosure defining a cavity enclosing at least a portion of the rear face of the panel, wherein the enclosure is acoustically opaque to prevent or reduce acoustic radiation from the rear face of the panel.

* * * * *